United States Patent [19]
Hughes et al.

[11] 3,823,529
[45] July 16, 1974

[54] PROCESS FOR SEPARATING CARBON MONOXIDE

[75] Inventors: Robert D. Hughes; Edward F. Steigelmann, both of Park Forest, Ill.

[73] Assignee: Standard Oil Company, Chicago, Ill.

[22] Filed: Feb. 23, 1973

[21] Appl. No.: 335,000

[52] U.S. Cl. .................................................. 55/16
[51] Int. Cl. ............................................ B01d 53/22
[58] Field of Search ......................... 55/16, 68, 158

[56] References Cited
UNITED STATES PATENTS

| | | | |
|---|---|---|---|
| 3,335,545 | 8/1967 | Robb et al. | 55/16 |
| 3,396,510 | 8/1968 | Wald et al. | 55/16 |
| 3,447,286 | 6/1969 | Dounoucos | 55/16 |

*Primary Examiner*—Charles N. Hart
*Attorney, Agent, or Firm*—Morton, Bernard, Brown, Roberts & Sutherland

[57] ABSTRACT

There is described the separation of carbon monoxide from gaseous mixtures by the combined use of liquid barrier permeation and metal complexing techniques. The liquid barrier is in contact with a semi-permeable film membrane, and the barrier contains complex-forming metal ions in aqueous solution. The metal ions may be, for example, cuprous or other metal ions, and mixtures of these metal ions, with or without other cations, may be used. The separation of carbon monoxide from lower alkanes, e.g., ethane and methane, or hydrogen is of particular interest.

6 Claims, No Drawings

PROCESS FOR SEPARATING CARBON MONOXIDE

This invention relates to the separation of carbon monoxide from gaseous mixtures containing it along with other material. More particularly, this invention is concerned with the separation of carbon monoxide by the combined use of liquid barrier permeation and metal complexing techniques wherein the liquid barrier containing complex-forming metal ions is in contact with semi-permeable membrane. The invention is especially useful for separating carbon monoxide from gaseous mixtures containing it, lower alkanes, for example, one or both of ethane and methane, and with or without hydrogen. Also the procedure may be used to separate carbon monoxide from other gaseous materials such as hydrogen, nitrogen or inert gases.

There is considerable commercial interest in separating carbon monoxide from mixtures containing it. The carbon monoxide separated may be more suitable to serve in various chemical syntheses such as carbonylation processes. Carbon monoxide may be separated from various gaseous mixtures to produce an off-gas having less carbon monoxide, and, therefore being purer in its other constituents. Thus hydrogen or alkane gases containing carbon monoxide can be treated to remove the latter and as a result produce a gas which is richer in hydrogen or alkane. Since carbon monoxide may be a catalyst poison, it can be desirable to remove it from a gas, e.g., hydrogen that is being charged to a chemical synthesis system for contact with a catalyst that is subject to poisoning by carbon monoxide.

When chemical mixtures are liquid under normal conditions or can readily be made so, ordinary distillation techniques can be used to separate the components of the mixture providing they have sufficiently different boiling points for the process to be economically feasible. When the mixture is essentially in a gaseous state at normal or ambient conditions of temperature and pressure, separation of the desired component from the mixture may be quite troublesome. In these situations, cryogenic processes may be used, but they are expensive. The components of these normally gaseous mixtures may not even have particularly close boiling points, but, nevertheless, the mixture must be cooled in order to separate one or more of its components. Cooling is an expensive procedure and it is, therefore, desirable to develop other ways of separating the components of gaseous mixtures.

The process of the present invention accomplishes the separation of carbon monoxide from gaseous mixtures containing it without the necessity of providing reduced or elevated temperatures. This process involves the combined use of liquid barrier permeation and metal complexing techniques and the system can exhibit high selectivity factors. In the process the liquid barrier is an aqueous solution containing metal ions which will complex with carbon monoxide, and the liquid barrier is employed in contact with a semi-permeable member which is essentially impermeable to the passage of liquid. A system of this type may employ the liquid barrier within a hydrophilic, semi-permeable film membrane, and in this manner, there is no need to maintain contact of the film with a separate or contiguous aqueous liquid phase during the process, thereby facilitating the use of a greater variety of semi-permeable members as far as physical configuration is concerned. Thus, the membranes can be designed without the hindrance of having to provide a separate liquid phase adjacent the film, and this may enable the use of film configurations having a greater surface or contact area.

The aqueous liquid employed to separate carbon monoxide may be disposed as a distinct, separate or continuous liquid phase on the feed side of the semi-permeable membrane, and the gaseous feed containing carbon monoxide can be introduced into the liquid phase. Alternatively, the aqueous liquid phase may be held in contact with a semi-permeable membrane by absorbing the liquid in a porous solid such as filter paper, and holding the wet paper next to the semi-permeable membrane in a sandwich-type cell construction. The physical limitations of this system may be unattractive, especially since the sandwich construction cannot easily be made in shapes which afford a sufficiently high surface area of film to provide good separation rates.

The process of this invention can be employed to separate carbon monoxide from other ingredients of the feed mixture providing the carbon monoxide exhibits a complexing rate or transfer rate across the liquid barrier that is greater than at least one other dissimilar or different component of the feedstock. Quite advantageously, the system can be used to separate carbon monoxide from hydrocarbons which may be aliphatically saturated materials, i.e., lower alkanes of say 1 to 3 or 4 carbon atoms, or from non-hydrocarbon materials, including fixed gases such as hydrogen, nitrogen, argon, helium and like materials which have little, if any, tendency to form complexes with the liquid barrier or dissolve therein.

In the method of the present invention, the mixture containing the carbon monoxide to be separated is essentially in the gaseous or vapor phase when in contact with the liquid barrier having dissolved therein one or more metal ions which form a complex with carbon monoxide. The liquid barrier is in contact with a semi-permeable membrane which may be permeable to the gaseous mixture in the absence of the liquid barrier. The semi-permeable member may, for instance, be a film or membrane of the type that has been employed heretofore for the separation or purification of various chemical materials. Such films are disclosed in U.S. Pat. Nos. 3,335,545 and 3,447,286, herein incorporated by reference, and are often polymer gels, including hydrogels. The liquid barrier can be placed adjacent to or within the semi-permeable membrane in a number of ways and the liquid does not pass from the carbon monoxide exit side of the membrane to an excessive extent under the conditions of operation. The membrane is, however, selectively permeable in the presence of the liquid barrier to carbon monoxide in the feedstock to be separated. Since there is little, if any, passage for the feedstock across the separation zone except by becoming part of or reacting with the liquid barrier, this barrier controls the selectivity of the liquid barrier-semi-permeable membrane combination.

The liquid barrier contains sufficient water and soluble metal ions to form a suitable complex with carbon monoxide in the feed subjected to the separation procedure. The metal ions readily form the complex upon contact with the feed, and, in addition, the complex dissociates back to the metal ion and carbon monoxide under the conditions which exist on the discharge side of the liquid barrier and semi-permeable membrane as employed in this invention. The released carbon monoxide exits the discharge side of the membrane and can be removed from the vicinity of the barrier and its supporting structure as by a sweep gas or through the effect of vacuum on this side of the barrier. Thus, the carbon monoxide-metal complex forms and is decomposed in the complex metal ion-containing liquid barrier, and as a result the material passing through the barrier is more concentrated with respect to carbon monoxide than is the feed gas. The separated carbon monoxide may be quite pure with respect to the presence of other components of the feed or the carbon monoxide may contain, often in minor amounts, other ingredients of the feed that have physically or chemically traversed the liquid barrier and film membrane. The feed need only contain a small amount of carbon monoxide as long as the amount is sufficient so that the carbon monoxide selectively reacts with the metal ions to a significant extent, and thus at least one other component of the feed is less reactive or non-reactive with the complex-forming metal ions. Frequently, such feed mixtures for the process contain about 0.1 to 90, often about 25 to 75, weight percent carbon monoxide, about 0 to 75 weight percent lower alkane and about 0 to 75 weight percent hydrogen with one or both of the lower alkane and hydrogen being present in an amount of at least about 10 weight percent.

The partial pressure of the carbon monoxide of the feed at the input side of the liquid barrier used in the present invention is greater than the partial pressure of carbon monoxide on the discharge or exit side of the liquid barrier-semi-permeable membrane combination. This pressure drop of the carbon monoxide to be separated may often be at least about 0.5 pound per square inch, and is preferably at least about 20 psi, although the pressure drop should not be so great that the film membrane is ruptured or otherwise deleteriously affected to a significant extent. Conveniently, the total pressure of the feed is up to about 1000 pounds per square inch. The discharge partial pressure of the carbon monoxide can preferably be controlled by subjecting the exit side of the film membrane to the action of a sweep gas that may be essentially inert to forming a complex with the metal ions in solution in the liquid barrier. The sweep gas picks up the discharged carbon monoxide, and the sweep gas may be selected so that it can be readily separated from the carbon monoxide if that be desirable for the subsequent use of the carbon monoxide. Unless a reaction with the separated carbon monoxide is desired, the sweep gas should be relatively inert therewith and may be, for instance, butane, carbon dioxide or the like.

The temperature across the liquid barrier-semi-permeable film combination employed in the method of this invention can be essentially constant or it may vary, and decomposition of the metal-carbon monoxide complex can be affected primarily by the drop in partial pressure of the carbon monoxide on the exit side of the liquid barrier compared with the partial pressure on the feed side. Conveniently, the temperature of the liquid barrier may be essentially ambient, but the temperature of the liquid barrier may, however, be reduced or elevated from ambient temperature. Often, the temperature may be up to about 100° C. Neither the temperature nor the pressure used should, however, be such as to destroy the difference in transport rate across the liquid barrier, semi-permeable film combination of the carbon monoxide compared with that of at least one other component of the feed. These conditions should also not be such that physical disruption of the liquid barrier or film occurs or any other significant malfunction results.

In the present invention we have found that those metals which can serve in the form of metal-containing cations to separate carbon monoxide in the feed mixture through the formation of metal complexes of desired properties include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g., nickel and iron. Copper is a particularly preferred complex-forming metal, and it is especially useful in cuprous form and may contain a minor amount of the cupric form of the metal, e.g., about 5 to 30 weight percent of the cupric form based on the total copper in solution in the liquid barrier. Others of the useful complex-forming metals are in the second and third transition series, i.e., having atomic numbers from 39 to 47 or 57 to 79, as well as mercury, particularly as the mercurous ion. Thus, we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complex-forming metals may also be employed in this invention, either in the presence or absence of other non-metal or non-complexing metal cations.

The metal is provided in the aqueous liquid barrier in a form which is soluble in this liquid. Thus, the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the carbon monoxide-containing feed to form an insoluble material which could block the film membrane or otherwise prevent the separation of carbon monoxide from the feedstock. Also, in a given system, the metal is selected so that the complex will readily form and yet be sufficiently unstable so that the complex will decompose and the dissociated carbon monoxide leave the liquid barrier, thereby providing a greater concentration of the carbon monoxide to be separated from the exit side of the membrane than in the feed. The concentration of the metal ions in the liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention include cuprous ions, ammonium ions can be used to provide copper ammonium complex ions which are active to form a complex with the carbon monoxide to be separated. We preferably supply about equimolar amounts of cuprous and ammonium ions in the liquid barrier solution, although either type of ions may be in excess. The ammonium ions can be provided in various convenient ways, preferably as an acid salt such as ammonium chloride or as ammonium hydroxide or ammonium carbonate. In order to enhance the selectivity of the copper ammonium ion complex in the separation of this invention, we may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution.

Instead of supplying only a noble metal for complexing the carbon monoxide in the process of this invention, we may also employ mixtures of noble metal and other cations. A portion of the noble metal may be replaced by non-noble metal or ammonium ions. Accordingly, the total of such ions in the liquid barrier may be composed of a minor or major amount of either the noble metal ions or the non-noble metal, ammonium or other cations. Solutions having a major amount of the non-noble metal, ammonium or other cations not containing a noble metal will generally be less expensive, and, accordingly, the noble metal may be as little as about 10 molar percent or less of the total cations in the solution. To reduce expenses, at least about 10 molar percent, preferably at least about 50 molar percent, of the total cations may be other than the noble metal cations. The non-noble or base metals are preferably of Groups II to VIII of the Periodic Chart of Elements, and especially those in the fourth and fifth periods, aluminum and magnesium. Zinc and cuprous ions are preferred ones among these non-noble or base metal ions. The various cations may be provided in the liquid barrier in the form of any suitable compound, such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus, small or minor amounts of water, say as little as about 5 weight percent, on a salt-free basis in the liquid phase may serve to provide significant transport for the carbon monoxide across the liquid barrier. Any other liquid present in the barrier is preferably water miscible and should be chosen as not to have a substantial deleterious effect on the separation to be accomplished. The liquid barrier may also contain a hygroscopic agent, e.g., in a minor amount, to improve the wetting or hydrophilic properties of the liquid and provide better contact with the feed gas. The hygroscopic agent may be of the types disclosed hereinafter.

In the system of the present invention, the aqueous barrier may be placed within a hydrophilic film membrane, and the amount of complex-forming metal in the semi-permeable membrane may vary considerably but is sufficient to accomplish the desired separation. Often this is a minor amount, say, about 1 to 50 weight percent, of the weight of the membrane on a non-aqueous basis, preferably about 5 to 25 weight percent. A preferred procedure for placing the solution of complex-forming metal in the semi-permeable film is by contacting the film with the solution and exerting a differential pressure across the solution and film. Thus, the pressure behind the solution is greater than that on the opposite side of the film, and as a result, the solution is forced into the film under pressure. Conveniently, the pressure on the solution is above atmospheric and the opposite side of the film is essentially at atmospheric pressure. The pressure differential need not be large, for instance, it may only be at least about 5 or 10 psi, and it should not be so great that the film is ruptured. This procedure could also be used to reactivate films which have been used to the extent that they have lost selectivity. effective The membrane containing the complex-forming metal may be handled and transported in a more or less non-aqueous form or with some water therein, for instance, an insufficient amount of water to be effectiv in the separation. In such case, water would be added to the membrane to give a film bearing sufficient water to be useful in performing the separation process of the invention. During use of the membrane, the amount of water present may be less than that which would give a substantial distinct or separate amount aqueous phase on the feed inlet side of the membrane. The film membrane can be wetted initially, and if it has a tendency to dry during use, additional water can be placed in the film while it is used on-stream to separate the carbon monoxide, for instance, by inclusion of moisture in the gaseous feed charged to the system. Alternatively, but less advantageously, the operation can be stopped for addition of water to the film. The water could be added at intervals by stopping the feeding of the gaseous mixture to the system, and charging water to the membrane at such times. In any event, care should be taken to insure that the film membrane during use is not so dry that it will exhibit non-selective permeability to carbon monoxide in the feed and will thereby not serve to separate a gas of increased carbon monoxide concentration.

The film membranes employed in the process of this invention can be of the essentially solid, water-insoluble, semi-permeable type. In the absence in the film of the liquid containing the complex-forming ions, the film is generally not adequately selective with respect to the passage of or permeation by carbon monoxide to perform the desired separation at the desired rate. Often, the film is permeable to essentially all of the components in the gaseous feedstock used in this invention. However, by having the film contain sufficient aqueous liquid to form a barrier the simple diffusion of gas through the film is reduced or prevented, and the components of the feed stream must therefore traverse the film primarily by becoming part of and then being separated from the aqueous liquid phase contained in the film. Thus, in the absence of the complexing metal ion in the aqueous medium, there could be a slight separation effected by the use of water as the liquid medium since the individual components in the gas may exhibit differing solubilities in water. In the method of the present invention, however, the selectivity of the separation of carbon monoxide is greatly increased due to the presence of the complex-forming metal ions in the aqueous barrier medium. Also, during use in the embodiment of the process of this invention in which the membrane contains the complex-forming metal, the film has sufficient of the aqueous medium so that adequate metal ions are in solution, or at least react as if they are, to perform the desired separation.

The film membranes which can be employed in this invention serve to prevent the simple diffusion of significant amounts of liquid materials through the film under the conditions at which the operation is conducted. Since an aqueous medium is employed in this system, the film may exhibit hydrophilic characteristics and is essentially unreactive with at least some of the complexing ions in the liquid barrier. The films can be readily made and some are commercially available. The film membranes are preferably self-supporting and have sufficient strength not to require any additional supporting material on either of its sides during use. With some films, however, it may be necessary, advantageous or convenient to provide adequate support such as additional film or sheet-like materials on one or both sides of the film membrane. These supporting structures are frequently very thin materials and may be permeable to both liquids and gases and not serve a separating function with respect to any component of the feed stream. Alternatively, the supporting film may be permeable to gases but not to liquids.

The semi-permeable membrane-complex-forming metal composites which may be employed in this invention may be made by a variety of procedures. For example, the membrane can be formed and then an aqueous solution containing the complex-forming metal ions absorbed into the film. Rather than add the aqueous liquid complexing solution to the semi-permeable membrane after it is formed, we may add the solution to the membrane-forming medium. Subsequently, the membrane can be made from this medium and the complex-forming metal ions are held within the membrane. Combinations of these means for adding the complexing solution to the membrane may also be used, and the membrane is sufficiently hydrophilic to hold the solution within the membrane in this form of the invention. This hydrophilic property may be present in the film membrane due to the character of the polymer forming the film or due to the presence of additives such as hygroscopic agents in the film which contribute to the hydrophilic nature of the composite. Both the polymer and additive may contribute hydrophilic properties, and a combination of a hydrophilic film and a hygroscopic agent may be advantageously employed. The film membrane may be considered sufficiently hydrophilic to be used in this form of the present invention if it absorbs at least about 5 weight percent of water when immersed in distilled water for one day at room temperature and pressure.

Suitable membranes for use in this invention include those which are in essence polymer gels, including hydrogels, formed from solutions containing the complex-forming ions. These polymer gels are exemplified by gels of the polyurethane type. Thus, we may react essentially hydrocarbon polyisocyanates, especially predominantly diisocyanate materials, with an aliphatic polyol, and preferably the latter has more than two hydroxyl groups per average molecule so that the polymer film is cross-linked sufficiently to give a membrane of adequate strength. The polyisocyanates often have about 4 to 20, preferably about 6 to 12, carbon atoms per molecule, and may be aliphatic, including cycloaliphatic, aromatic or mixed structures of these types. The polyol is preferably, but not necessarily, water-soluble, and often the polyol may have a molecular weight of at least about 100. Suitable polyols include the polyvinyl alcohols, polyoxyethylene alcohol ethers, cellulose and its hydroxyl-containing derivatives and hydroxylated polymethacrylates and polyacrylates. If desired, in making the polyurethanes, the polyisocyanate and polyol may be reacted in approximately stoichiometric amounts; however, either reactant may be in excess, especially the polyol, since free polyol remaining may serve as a hygroscopic agent.

The film membrane may be in any useful physical shape. Flat film sheet is one form, although greater surface areas and more efficient separation may be provided by using tubular fibers of the types disclosed in, for instance, U.S. Pat. No. 3,228,877, herein incorporated by reference. This patent described a variety of hydrophobic or hydrophilic hollow fibers which may be employed in the present invention. The more hydrophobic polymers may be made more hydrophilic by the incorporation of materials which increase the affinity of the polymers for water. The useful membranes include, for example, those of cellulose acetate, polyesters, nylon, polyvinyl chloride, polyvinyl alcohols, polyvinyl acetate, polystyrene, cation exchange resins such as divinylbenzene cross-linked, sulfonated polystyrenes, olefin polymers such as polyethylene, polypropylene and ethylene-propylene copolymers, polyurethanes, ethylene-vinyl acetate copolymers, ethylene-ethyl acrylate copolymers, silicone elastomers and the like. Other suitable membranes are described in "Gas Permeability of Plastics", Major et al., *Modern Plastics*, page 135 et. seq., July, 1962; and U.S. Pat. Nos. 3,133,132; 3,133,137; 3,256,675; 3,274,750; 3,325,330; 3,335,545; 3,396,510 and 3,447,286, all incorporated herein by reference. The film membranes may often have a thickness up to about 30 mils or more, and we prefer to employ membranes having a thickness up to about 10 mils. The films must have sufficient thickness to avoid rupture at the pressures employed and often the films may have a thickness of at least about 0.001 mil.

We may composite the membrane in a manner so that the film has increased hydrophilic properties, and, preferably, a reduced tendency to lose water from the membrane during the performance of the separation. Thus, the film can be composited with a water-soluble or water-insoluble hygroscopic agent in a small amount effective to accomplish these purposes, and a film which might otherwise have properties that are too hydrophobic to contain the aqueous liquid barrier within the film, may be made sufficiently hydrophilic to be useful in this form of the method of this invention by the use of the hygroscopic agent. The hygroscopic agent may improve the permeability of the film and aid in maintaining its physical strength when it is swollen with the aqueous liquid barrier. Also, the hygroscopic agent may improve the selectivity of the film in the carbon monoxide separation process. The hygroscopic agents include polymers such as polyvinyl alcohols, polyacrylic acids, polyvinyl ethers, polyoxyalkylene glycols and their carboxylic acid esters, and the like. Non-polymeric hygroscopic agents include ethylene glycol, glycerol and propylene glycol, and the agents may also be alkylated carboxycellulose derivatives such as methyl and ethyl carboxycellulose. Thus, the agents are frequently composed essentially of carbon, hydrogen and oxygen, and, for instance, may be polyols, polyethers, polyether esters, and the like. The hygroscopic agents should not unduly deleteriously affect the complex-forming reaction in the system of this invention or react with the film membrane in a disadvantageous manner. Thus, the agent should not cause precipitation of the complex-forming metal or make it inactive, or dissolve the polymer film. When used, the hygroscopic agents are often present in the film in minor amounts, say about 0.1 to 40 weight percent based on the total weight of the semi-permeable membrane without this agent and the liquid aqueous complexing solution. Preferably, this amount is about 1 to 20 weight percent, although in some situations the hygroscopic agent is preferably used in greater amounts. Thus, in the use of composites of nylon and polyvinyl alcohol, preferred compositions may contain about 25 to 75 weight percent of each of these materials, more preferably about 40 to 65% polyvinyl alcohol and about 35 to 60% nylon.

The method of this invention will be further described with reference to the following specific examples.

A closed, glass test cell was equipped with a gas inlet tube passing through the cap of the cell and extending to close to the bottom of the cell where the tube ended in a fritted gas bubbler within the liquid phase of the cell. The cell internal cross-sectional area was 4.9 cm² and the length was 20 cm. The gas inlet tube was surrounded at its upper end with a feed gas outlet tube whose lower end opened into the upper part of the cell at a point just below the cell cap and above the liquid level in the cell. A separate tube for exhausting permeate gas from the cell extended nearly the length of the cell and was immersed in the liquid for most of the length of the tube. The permeate outlet tube passed through the cell cap. This tube housed a smaller purge gas inlet tube that opened into the lower portion of the permeate outlet tube. Thus, during operation, the purge gas swept essentially the entire length of the inside of the permeate outlet tube.

The feed gas was charged into the aqueous liquid in the cell by way of the gas bubbler, and the exhaust or raffinate components of the gas left the cell by the gas outlet tube. The permeate outlet tube was a ¼ inch O.D. × 8 inches Selas tube having pores of 0.27 microns in diameter. The outside of the Selas tube was covered with a room temperature-cured coating of silicone-rubber resin activated with tin dilaurate (General Electric RTV-60, Trademark), to form a semi-permeable membrane. The portion of the Selas tube above the liquid level was sealed so that exhausted feed gas would not enter the permeate outlet tube. Also, the portion of the permeate outlet tube outside of the cell was connected to a sampling device so that the product gas could be sampled for gas chromatographic analysis.

The cell was filled except for a small volume just below its cap, with an aqueous solution made by dissolving 305 grams of ammonium carbonate, 245 grams of concentrated ammonium hydroxide, 170 grams of cuprous chloride, and 27 grams of cupric chloride in enough distilled water to make one liter of solution. The sweep gas contacted the inside surface of the permeate gas outlet tube, picked-up the materials leaving the membrane and then exited the cell as a product stream. The product was analyzed by gas chromatography.

The cell was used to separate carbon monoxide from a mixed gas stream containing 40.6 wt. % CO and 59.4 wt. % ethane while employing copper ions as the complexing metal. The feed gas was fed to the solution in the cell at various pressures at the rate of 9 to 10 ml./min. The purge side of the membrane tube was swept with helium at the rate of 10 ml./min.

The results of these tests were as follows:

TABLE I

| Test No. | Feed gas pressure (psig) | Composition of permeate, weight %, helium-free basis | | |
|---|---|---|---|---|
| | | CO | $C_2H_6$ | S.F.* |
| (Feed Gas Composition | | 40.6 | 59.4) | |
| 1 | 15 | 93.8 | 6.2 | 22.1 |
| 2 | 30 | 93.3 | 6.7 | 22 |
| 3 | 45 | 91.3 | 8.7 | 15.4 |

*S.F. = carbon monoxide selectivity factor =

$$\frac{\text{Conc. of CO in Permeate}}{\text{Conc. of } C_2H_6 \text{ in Permeate}} \times \frac{\text{Conc. of } C_2H_6 \text{ in Feed}}{\text{Conc. of CO in Feed}}$$

The data show that the carbon monoxide was selectively passed through the membrane, yielding a product having greater than 90% CO (helium-free basis).

It is claimed:

1. A method for separating carbon monoxide which comprises contacting a gaseous mixture containing carbon monoxide with a first side of an essentially solid, water-insoluble, semi-permeable membrane in contact with an aqueous liquid barrier having metal ions which combine with carbon monoxide to form a water-soluble complex, the partial pressure of carbon monoxide on a second side of said semi-permeable membrane being sufficiently less than the partial pressure of carbon monoxide in said mixture to provide separated carbon monoxide on said second side of said semi-permeable membrane, and removing separated carbon monoxide from the vicinity of said second side of said semi-permeable membrane.

2. The method of claim 1 in which said metal ions are cuprous ions.

3. The method of claim 2 in which said mixture contains ethane.

4. A method for separating carbon monoxide which comprises contacting a vaporous mixture containing carbon monoxide and a lower alkane with a first side of an essentially solid, water-insoluble, semi-permeable membrane in contact with an aqueous liquid barrier, said semi-permeable membrane being permeable to said vaporous mixture in the absence of said aqueous liquid, said liquid barrier having metal ions which combine with carbon monoxide to form a water-soluble complex, the partial pressure of carbon monoxide on a second side of said semi-permeable membrane being sufficiently less than the partial pressure of carbon monoxide in said vaporous mixture to provide separated carbon monoxide on said second side of said semi-permeable membrane, and removing separated carbon monoxide from the vicinity of said second side of said semi-permeable membrane.

5. The method of claim 4 in which said lower alkane is ethane.

6. The method of claim 5 in which said metal ions are cuprous ions.

* * * * *